No. 749,541. PATENTED JAN. 12, 1904.
A. DUBACH.
COMBINED CORN PLANTER AND MARKER.
APPLICATION FILED JAN. 17, 1903.
NO MODEL. 2 SHEETS—SHEET 1.
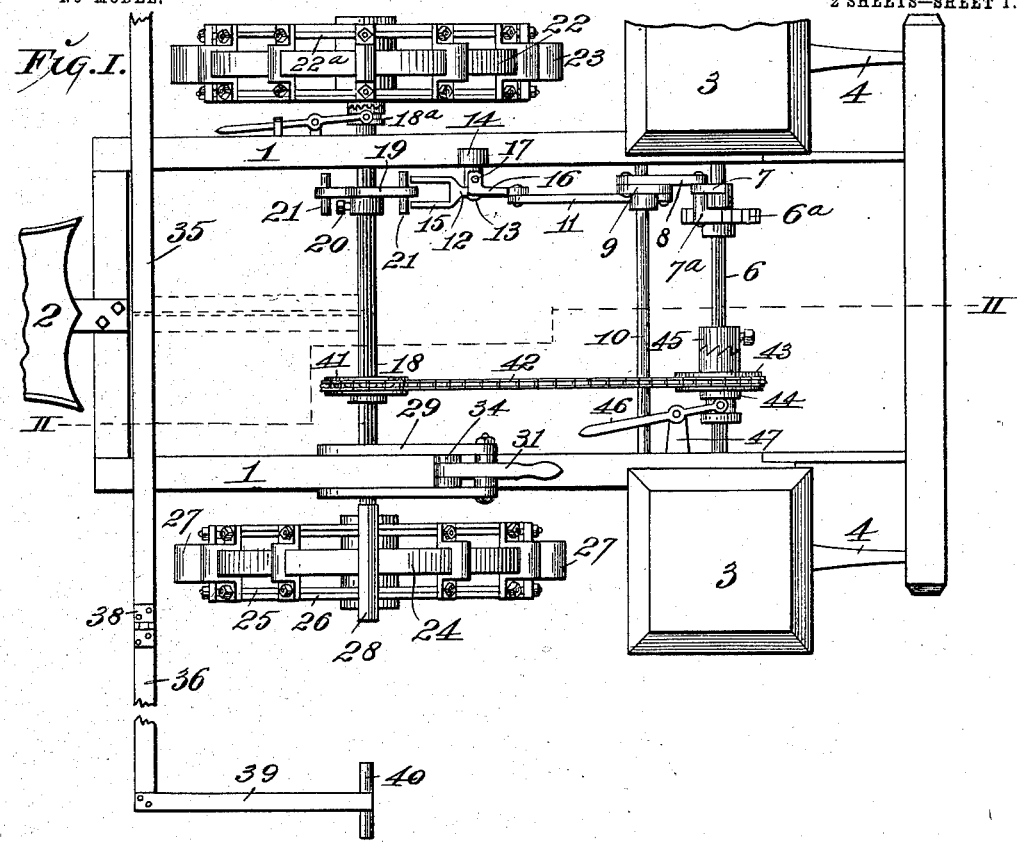
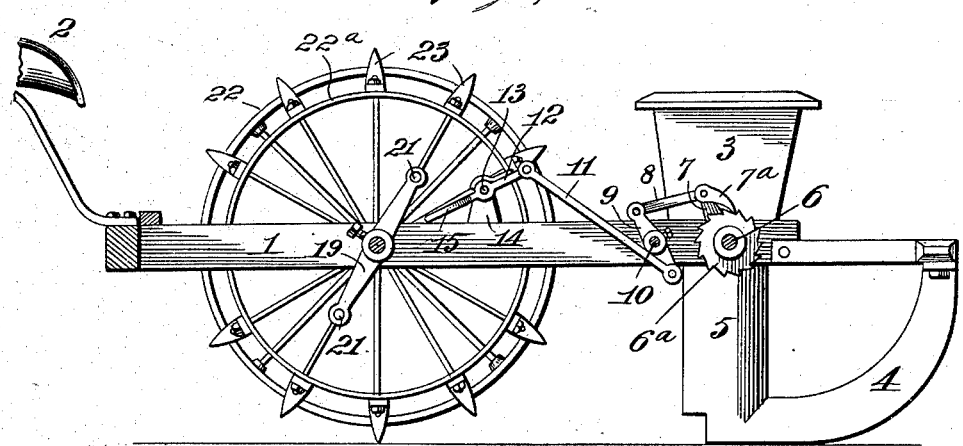
attest:—
M. P. Smith
E. S. Knight
Inventor:
Anton Dubach
By Wright & Bro
atty's.

No. 749,541. PATENTED JAN. 12, 1904.
A. DUBACH.
COMBINED CORN PLANTER AND MARKER.
APPLICATION FILED JAN. 17, 1903.
NO MODEL. 2 SHEETS—SHEET 2.
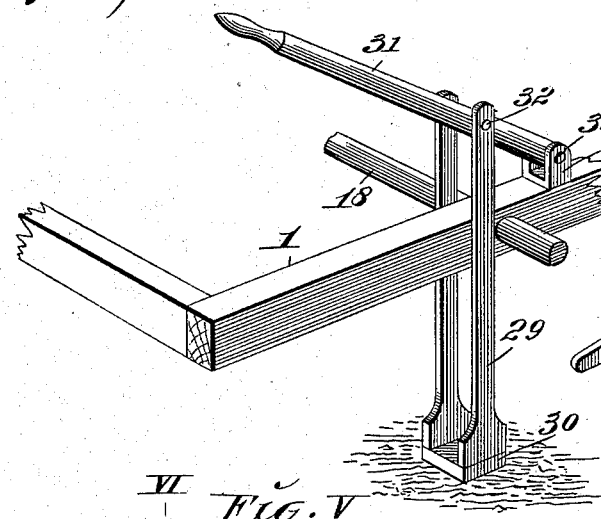
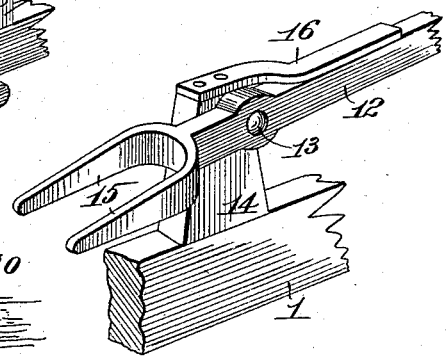
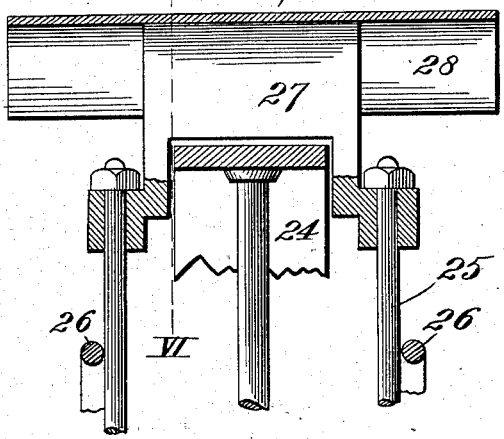
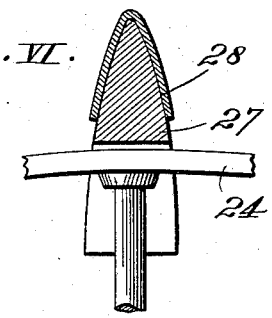
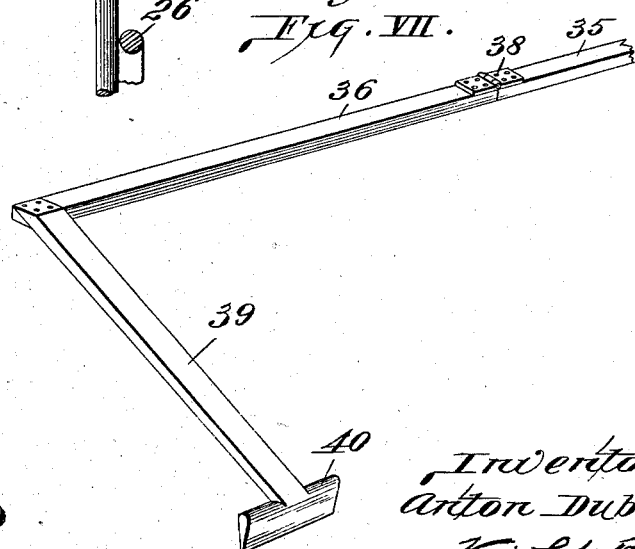
Inventor:—
Anton Dubach:—
By Knight & Bro
atty's.

No. 749,541. Patented January 12, 1904.

UNITED STATES PATENT OFFICE.

ANTON DUBACH, OF HIGHLAND, ILLINOIS.

COMBINED CORN PLANTER AND MARKER.

SPECIFICATION forming part of Letters Patent No. 749,541, dated January 12, 1904.

Application filed January 17, 1903. Serial No. 139,381. (No model.)

*To all whom it may concern:*

Be it known that I, ANTON DUBACH, a citizen of the United States, residing in Highland, in the county of Madison and State of Illinois, have invented certain new and useful Improvements in a Combined Corn Planter and Marker, of which the following is a full, clear, and exact description, reference being had to the accompanying drawings, forming part of this specification.

My invention relates to a planter and marker for dropping corn in hills or drilling it into the ground, the object of the invention being to produce a simple, efficient, and thoroughly practical machine of the character named that will be as serviceable as the check-row cornplanter now in use and in which a check-wire is employed without the use of such check-wire.

The invention consists in features of novelty hereinafter fully described, and pointed out in the claims.

Figure I is a top or plan view of my planter and marker. Fig. II is a vertical longitudinal section taken on line II II, Fig. I, with parts of the machine shown in elevation. Fig. III is a perspective view of a portion of the frame of the machine and means for elevating said frame to permit rotation of the ground-wheel bearing the markers I utilize. Fig. IV is a perspective view of the trigger by which the grain-dropper is actuated. Fig. V is a view, partly in section and partly in elevation, of a portion of the marking-wheel and one of the markers carried thereby. Fig. VI is a section taken on line VI VI, Fig. V. Fig. VII is a perspective view of the row-indicator.

1 designates the frame of my planter and marker, on which the driver's seat 2 is mounted.

3 designates the grain-boxes, mounted on the frame 1, and 4 and 5 are respectively the runners or furrow-openers and delivery-chutes by and through which the furrows for the grain are opened and the grain deposited therein.

6 is a shaft through the medium of which the valves (not shown) of the grain-boxes 3 are actuated in any well-known manner.

7 is a crank-arm loose on the shaft 6, and 8 is a link pivotally connected to said crank-arm. The crank-arm 7 carries a pawl $7^a$, that engages a ratchet-wheel $6^a$, fixed to the shaft 6.

9 is a rocket fixed to a shaft 10, mounted in the frame 1 and to one end of which the link 8 is pivoted.

11 is a connecting-rod pivoted to the end of the rocker 9 opposite to that which receives the connection of the link 8.

12 designates a trigger pivotally mounted at 13 on a standard 14, which is carried by one of the side bars of the frame 1. The forward end of the trigger 12 is pivotally connected to the connecting-rod 11. The rear end of the trigger consists of a fork 15. (See Figs. I and IV.)

16 is a spring fixed to the standard 14 at 17 and adapted to bear at its free end against the forward end of the trigger to hold said end normally depressed.

18 designates the axle of the planter, which is journaled in the frame 1.

19 is a double-armed tripper adjustably held to the axle 18 by a set-screw 20, and 21 designates studs carried by the arms of said tripper and adapted to strike the arms of the fork 15 as the axle 18 is rotated in its bearings.

22 designates a ground-wheel in which the axle 18 is loosely mounted. This wheel is during the planting operation normally held rigid with the axle by a clutch $18^a$, the members of which are disengaged to permit free rotation of the ground-wheel on the axle without turning it and operating the grain-dropping mechanism, turning the machine at the end of each row planted.

$22^a$ is a cage fixed to the hub of the wheel 22 and provided with a series of teeth 23, that are adapted for service in obtaining purchase in the ground in the rotation of said wheel.

In the practical use of my planter the grain is dropped by the actuation of the parts in the following manner: On the rotation of the ground-wheel 22 like rotation is imparted to the axle 18, and the tripper 19 is carried with the axle to cause the studs 21, carried by its arms, to intermittently strike the fork 15 of the trigger 12. Each time that the fork of the trigger is struck the forward end of the trigger is rocked upwardly and the connecting-rod 11 is moved longitudinally in a rearward and upward direction. The movement thus imparted to the connecting-rod is communicated to the rocker 9, link 8, and crank-arm 7 to rock the shaft 6 and actuate the valves of the grain-boxes and effect deposit into the ground from said boxes. As soon as the studs of the tripper 19 pass the fork 15 the spring 16 returns the trigger 12 to its normal position ready for the next actuation thereof by the tripper.

24 designates a ground-wheel loosely mounted on the axle 18 and inclosed by a rigidly-mounted marking-wheel frame consisting of spokes 25, joined by rings 26, and teeth 27, mounted on the outer ends of said spokes. (See Figs. I and V.)

28 designates markers, preferably of V shape in cross-section, as most clearly seen in Fig. VI. The markers 28 are of greater length than the teeth 27 and are secured to a portion of said teeth equidistant from each other, so that upon the rotation of the marking-wheel frame the markers will be carried by the teeth 27 to form depressions in the ground over which the marking-wheels travel.

29 designates a jack-fulcrum of bifurcated form, as seen in Figs. I and III, and which straddles the side bar of the frame 1 at the side of said frame coincident with the marking-wheel. The jack-fulcrum 29 is provided with a foot 30, that is adapted to be brought to the ground at any time for the purpose of raising the marking-wheel side of the planter to lift said marking-wheel off the ground.

31 is a lever pivoted at 32 to the jack-fulcrum 29 and at 33 to a bracket 34, carried by the frame 1.

In the travel of the ground-wheel over the ground being planted the markers 28 effect depressions in the soil corresponding to locations or positions in which the grain is dropped to designate the positions of the grain planted in rows. On beginning each succeeding row it is desired to start the operation of dropping grain in crossing lines with respect to the previously-planted rows, and for this purpose the marking-wheel is designed to be moved to bring one of the markers 28 carried thereby into line with the depressions indicating the positions of the previously-planted grain. To so move the marking-wheel, it is necessary that it be lifted from the ground, and to this end I make use of the jack described, which upon the depression of the hand-lever 31 is brought to the ground and upon continued downward movement of said lever the frame of the planter at the marking-wheel side is lifted by the jack and the marking-wheel is raised off the ground. The marking-wheel may be then rotated until one of the markers is brought into corresponding line with the cross rows or depressions previously made thereby.

35 designates a cross-beam carried by the frame 1 at its rear end, and 36 (see Figs. I and VII) represents bars connected to said cross-beam by hinges 38.

39 designates indicator-carrying arms fixed to the bars 36 and extending downwardly and forwardly therefrom and provided with indicators 40 at their free ends. The indicators 40 are adapted to be thrown to the ground at the commencement of each succeeding row planted and be moved along the line of the preceding row in the travel of the planter until the first hill of grain is reached. When the indicator has been moved to the position stated, it serves to denote the precise point at which the planter is to be stopped and the marking-wheel set into proper registration with the preceding cross-row to gain exact alinement therewith.

The machine herein described is serviceable in drilling corn into the ground, as well as planting it in hills at intervals, and to provide for the drilling operation I mount a toothed wheel 41 on the axle 18 and apply thereto a driving-chain 42. The chain 42 leads to and around a toothed wheel 43, carried by a sleeve 44, loosely mounted on the shaft 6. The sleeve 44 is provided at one end with ratchet-teeth that engage the opposing ratchet-teeth of a clutch-collar 45, that is held rigidly to the shaft 6.

46 is a lever pivoted to a bracket 47, mounted on the frame of the planter and having engagement with the sleeve 44, as seen in Fig. I. On the movement of the lever 46 the sleeve 44 may be thrown into engagement with the clutch-collar 45, so that the movement imparted to the drive-chain 42 from the axle 18 will be imparted to said clutch-collar to rotate the shaft 6 and effect deposit of grain through the valves (not shown) of the grain-boxes actuated by said shaft.

It is obvious that the planter may also be used for drilling the grain into the ground by the employment of a greater number of arms in the tripper 19, so that the trigger 12 will be actuated more frequently to effect more frequent actuations of the valves through which the grain is fed from the grain-boxes 3.

I claim as my invention—

1. In a corn-planter, the combination of an axle, a pair of ground-wheels in which said axle is loosely mounted, means for connecting one of said ground-wheels to said axle, a cage secured to said ground-wheel that connects with the axle for securing ground purchase, and a marking-wheel fixed to said axle adjacent to the second ground-wheel, substantially as set forth, 2. In a corn-planter, the combination of an axle, a pair of ground-wheels in which said axle is loosely mounted, a clutch for connecting one of said ground-wheels to said axle, a cage secured to said ground-wheel that connects with the axle for securing ground purchase, and a marking-wheel fixed to said axle adjacent to the second ground-wheel, substantially as set forth.

3. In a corn-planter, the combination of an axle, a pair of ground-wheels in which said axle is loosely mounted, a clutch for connecting one of said ground-wheels to said axle, a cage secured to said ground-wheel that connects with the axle for securing ground purchase, a marking-wheel fixed to said axle adjacent to the second ground-wheel, and grain-dropping mechanism having operating connection with said axle, substantially as set forth.

ANTON DUBACH.

In presence of—
EMIL WILDI,
FREMONT C. RUHNEN.